United States Patent
Zoelfl et al.

(10) Patent No.: US 10,960,595 B2
(45) Date of Patent: Mar. 30, 2021

(54) METHOD FOR OPERATING A HANDLING SYSTEM FOR HANDLING CONTAINERS WITH RECIPE CREATION FOR THE CONTROL

(71) Applicant: KRONES AG, Neutraubling (DE)

(72) Inventors: Markus Zoelfl, Metten/Berg (DE); Robert Aust, Illkofen (DE)

(73) Assignee: KRONES AG

( * ) Notice: Subject to any disclaimer, the term of this patent is extended or adjusted under 35 U.S.C. 154(b) by 286 days.

(21) Appl. No.: 16/079,425

(22) PCT Filed: Dec. 29, 2016

(86) PCT No.: PCT/EP2016/082807
§ 371 (c)(1),
(2) Date: Aug. 23, 2018

(87) PCT Pub. No.: WO2017/144145
PCT Pub. Date: Aug. 31, 2017

(65) Prior Publication Data
US 2019/0022915 A1    Jan. 24, 2019

(30) Foreign Application Priority Data
Feb. 23, 2016    (DE) .................... 10 2016 103 117.8

(51) Int. Cl.
*B29C 49/42*    (2006.01)
*B29C 49/78*    (2006.01)
*G05B 15/02*    (2006.01)

(52) U.S. Cl.
CPC ............ *B29C 49/421* (2013.01); *B29C 49/78* (2013.01); *B29C 49/783* (2013.01);
(Continued)

(58) Field of Classification Search
CPC ...... B29C 49/78; B29C 49/783; B29C 49/786; G05B 2219/32096; G05B 2219/31103; G05B 15/02
See application file for complete search history.

(56) References Cited

U.S. PATENT DOCUMENTS

| | | | |
|---|---|---|---|
| 9,102,090 B2 | 8/2015 | Haesendonckx et al. | B29C 49/78 |
| 9,302,802 B2 | 4/2016 | Piana | B65B 59/00 |

(Continued)

FOREIGN PATENT DOCUMENTS

| | | | |
|---|---|---|---|
| DE | 102009040803 | 4/2011 | B29C 49/42 |
| EP | 2415677 | 2/2012 | B65B 57/00 |
| WO | WO2005022279 | 3/2005 | G05B 19/042 |

OTHER PUBLICATIONS

German Office Action (w/machine translation) issued in application No. 10 2016 103 117.8, dated Nov. 3, 2016 (15 pgs).

(Continued)

*Primary Examiner* — Robert B Davis
(74) *Attorney, Agent, or Firm* — Hayes Soloway P.C.

(57) ABSTRACT

A method for operating a system for handling containers, wherein said system for handling containers has a first handling device which handles the containers in a first predetermined manner, and at least one second handling device which handles the containers in a second predetermined manner, and a transport device which transports the containers from the first handling device to the second handling device. A control device controls the handling of the containers by at least one of the two handling devices using at least one first physical parameter which is characteristic of environmental conditions at an operating site of the system and/or using at least one second physical parameter which is characteristic of a physical property of the containers to be handled, wherein at least one of these (Continued)

physical parameters is determined and an operating recipe is determined independently of the system and taking this parameter as a basis, which operating recipe is used by the control device to control at least one handling device.

20 Claims, 2 Drawing Sheets

(52) U.S. Cl.
CPC ............ B29C 49/786 (2013.01); G05B 15/02 (2013.01); *B29C 49/42* (2013.01); *G05B 2219/31103* (2013.01); *G05B 2219/32096* (2013.01)

(56) References Cited

U.S. PATENT DOCUMENTS

| | | | | |
|---|---|---|---|---|
| 9,375,878 | B2* | 6/2016 | Hahn | B67C 3/007 |
| 2005/0194705 | A1 | 9/2005 | Smith | 264/40.1 |
| 2006/0082009 | A1* | 4/2006 | Quail | B22D 17/007 |
| | | | | 264/40.1 |
| 2010/0106279 | A1* | 4/2010 | Yamamoto | G05B 19/41865 |
| | | | | 700/105 |
| 2012/0085071 | A1* | 4/2012 | Hahn | B29C 49/78 |
| | | | | 53/411 |
| 2012/0226376 | A1* | 9/2012 | Haesendonckx | B29C 49/78 |
| | | | | 700/109 |
| 2014/0298100 | A1* | 10/2014 | Grimm | G05B 19/4184 |
| | | | | 714/37 |
| 2016/0136868 | A1* | 5/2016 | Haller | B29C 49/78 |
| | | | | 264/37.16 |

OTHER PUBLICATIONS

International Search Report and Written Opinion (w/translation) issued in application No. PCT/EP2016/082807, dated May 11, 2017 (26 pgs).

* cited by examiner

METHOD FOR OPERATING A HANDLING SYSTEM FOR HANDLING CONTAINERS WITH RECIPE CREATION FOR THE CONTROL

BACKGROUND OF THE INVENTION

The present invention relates to a method for handling containers and, in particular, to a method for operating corresponding systems for handling containers. Such systems for handling containers are known from the prior art in a variety of forms. For example, molding devices are known which mold plastic preforms into plastic containers. In addition, ovens are known which heat such plastic preforms in preparation for a molding process, such as in particular a blow molding process.

In addition, however, other systems are also known, which are used for handling such containers and in particular such plastic containers, for example filling machines, labelling machines, printing machines and the like. In the operation of such machines, however, it may occur that the operation is heavily influenced by different environmental conditions, for example different ambient temperatures, pressures, or moisture levels. The operating conditions of the system can be markedly different depending on its installation site. Thus, for example, the ambient pressures at an installation site at sea level differ significantly from an installation site at high altitude, for example at a height of more than 4000 m. For example, the air requirement for a stretch blow-molding machine operated at sea level is much lower than the air requirement of a system operated at high altitude. Also, the significantly lower boiling point of a system operated at high altitude can significantly affect the operation of this system.

Also, in practice it is not possible to detect from the resulting product, i.e., for example the finished filled and labelled bottle, which machine was the source of, for example, a deviation from a nominal value.

In all, or in a plurality of handling stations the containers are under pressure, so that, for example, a diameter deviation can be caused in all three machines or only in one. This makes control difficult, and so far, no standard procedures have been defined.

The object of the present invention therefore is to create a means of also allowing for environmental factors before (and/or during) the operation or during or prior to the initial installation of such machines, and of creating an operating recipe on the basis of these on-site operating conditions.

SUMMARY OF THE INVENTION

In a method according to the invention for operating a system for handling containers, this system for handling containers has a first handling device which handles the containers in a first predetermined manner, and a second handling device which handles the containers in a second predetermined manner, and a transport device which transports the containers from the first handling device to the second handling device.

In accordance with the invention, a control device controls the handling of the containers by at least one of the two handling devices using and/or on the basis of a first physical parameter, which is characteristic of environmental conditions at an operating site of the system, and/or using and/or on the basis of at least one second physical parameter, which is characteristic of a physical property of the containers to be handled, wherein at least one of these physical parameters is determined and an operating recipe is determined independently of the system and taking this parameter as a basis, which operating recipe is used by the control device to control at least one handling device.

Handling of containers covers any processes which affect the containers and/or their properties, in particular, the handling processes are selected from a group of handling processes which includes heating the plastic preforms, sterilization of the plastic preforms, molding the plastic preforms to form the plastic containers or plastic bottles, filling the plastic containers, sterilization of the plastic containers and equipping the plastic containers, for example labelling, printing or closing the containers.

Determining the operating recipe independently of the system is understood to mean, in particular, that this determination is determined temporally and/or geographically independently of this system, in particular at a different location. In particular, it is immaterial for the determination of the operating recipe whether the system is currently in operation or not. In other words the determination of the operating recipe does not in particular depend on a current status of the system.

It is therefore proposed that appropriate operating recipes for operating the system are determined and in doing so, in particular, local conditions of the system are taken into account and/or conditions which are characteristic of the operation of the system at its operating site, such as in particular, but not exclusively, the climatic conditions at the operating site or, for instance, material-specific conditions (e.g. the plastic preforms).

A means is therefore preferably proposed for taking the above-mentioned influences into account even before the operation or before the initial installation. The term "before the initial installation" in this context is understood to mean that an operating recipe obtained with this method is already taken into account during the production or assembly of the container handling machine and thus, for example, is already transferred into the machine control system. The advantage is that at least a rough parameterization can be specified in advance. Another advantage is that the system can be "started up" by the customer at least with reduced performance/quality and a fine correction can then be performed, for example by the manufacturer's specialists. These specialists therefore no longer have to wait until all mechanical and electrical deficiencies are resolved but can arrive just in time.

This enables a recipe to be created based on known conditions on site. In a preferred method, these parameters are therefore determined at the place of initial installation of this system. Advantageously this involves a physical parameter which affects the operation of the system and which in particular affects the handling outcome.

In a preferred method, the system comprises a molding device which molds and in particular expands plastic preforms into plastic containers. In particular, this molding device is a blow-molding machine, in particular a stretch blow molding machine. In a further preferred method, the system has a heating device which heats up plastic preforms. This heating device is therefore preferably located upstream of the molding device, so that plastic preforms are first heated and these heated plastic preforms are then expanded with a gaseous medium and, in particular, compressed air. These containers are preferably plastic containers. However, it should be pointed out that the present invention can also be applied to the production and/or processing of other containers, such as glass containers.

In a further preferred method, the device comprises a filling device which fills the containers produced, which are in particular plastic containers, with a liquid and, in particular, a drink. In a further preferred method, the expanded containers are provided with labels and/or printed items. It is possible herein that both the already filled containers are fitted with the labels, and that the molded and not yet filled containers (i.e. before the filling stage) are fitted with corresponding labels (generally referred to as equipment).

In a further preferred method, the operating recipe contains at least one operating parameter, preferably a plurality of operating parameters. Operating parameters are understood to mean parameters which are relevant to or are specified for the production of the containers. Advantageously these operating parameters are selectively chosen from a group of operating parameters which includes an operating speed, an oven temperature for heating the plastic preforms, pressures for expanding the plastic preforms, rotation speeds of plastic preforms inside the heating device, temperatures and the like.

In addition, these operating parameters can also be specific to consumable materials. Thus an operating recipe may contain information about which adhesives should be used for sticking on labels in certain climatic environments. Also, recommendations on sterilization agents to be used can be issued as part of the operating recipes. In addition, however, material properties can be proposed as part of the operating recipes, such as certain sealing elements and the like. The operating recipe therefore also preferably contains at least one piece of information which is characteristic of the use of a specific operating substance (e.g.: label glue, sterilization medium or (liquid or gaseous) sealant) and/or of a material to be used for the operation.

In a further preferred method, the system also has a sterilization device which sterilizes the plastic preforms or the plastic containers manufactured therefrom. This sterilization device can apply a flow-capable sterilization medium, for example hydrogen peroxide, to the plastic preforms or the plastic bottles manufactured therefrom. It would also be possible, however, for the sterilization to be performed by exposure to electromagnetic radiation, in particular electron radiation, X-rays or UV radiation.

In a further preferred method, the operating recipe is determined at least at a different location from the operating site. Thus, it would be possible, for example, for the said physical parameters to be determined at the operating site and the corresponding operating recipes to be determined on the basis of these parameters at a different site, such as the site of manufacture of the system. Thus, it would be possible for a plurality of sensors which measure environmental conditions to be located at the operating site, for example in the factory of a customer. These data can then be transferred to the manufacturer of the machine where they are preferably analyzed.

In a further preferred method, on the basis of the at least one physical parameter, operating conditions are simulated and/or created at the location different from the operating site, which are adapted to the environmental conditions at the operating site. It is thus possible, for example, that at the manufacturing site a climate chamber is used on which the environmental conditions of the operating site are reconstructed or daily profiles or long-term profiles are followed. Thus, for example a daytime temperature at the operating site can be measured and this operating temperature can be reconstructed in a test environment.

It would also be possible, however, in the context of a model, such as a computer model, to simulate said operating conditions and thus the way in which the system responds to the given operating conditions can be identified and/or simulated. Preferably these environments are adapted as closely as possible to the conditions at the site of operation in the simulation or test environment. Alternatively, the environmental conditions can be evaluated using artificial intelligence. These computing models are particularly suitable for variable parameters, which are not set or defined until the initial operation stage or the final bottle design, such as the final blowing pressure for the final bottle shape or contour shape. This allows, for example, a plurality of recipes to be created for different pressures. As the simplest form of the recipe creation, database information on existing systems can be incorporated into the recipe creation. In addition, it would also be possible in this context, for example, for meteorological data on a specific installation site to be taken into account.

The response of the machine is determined on the basis of these values and so operating recipes can be issued. These can, in turn, be transferred to the customer and adjusted on site. However, this on-site adjusting can also be carried out automatically. In a further preferred method the control device is suitable and designed for performing open-loop and/or closed-loop control of the working operation of the machine on the basis of the predefined operating recipes.

In a further preferred method, the operating recipe is determined using a different system for handling containers. In this approach, a further system is provided at the production site, which is put into operation with the abovementioned determined operating or environmental conditions. Thus for example, this corresponding additional machine can be operated within a climate chamber and so can be used to determine which is the correct operating recipe. Preferably, the other system is an identical system to the system to be commissioned. In this way, the necessary operating recipes can be determined with high accuracy.

In a further preferred method the first physical parameter is selected from a group of physical parameters, which includes an ambient temperature in the machine room in which the system is located, an external temperature, an indoor temperature, a temperature of specific components, an air pressure, an air humidity, a moisture level of plastic preforms, a temperature of plastic preforms, and the like. These environmental conditions are preferably recreated in the test environment to test the responses of the machine to them.

In a further preferred method the first parameter is sent, for example, to a manufacturer. Preferably, this transmission takes place wirelessly, for example via the internet.

In a further preferred method the first physical parameter is determined by means of a sensor device. It is thus possible, as mentioned above, for these parameters to be determined at the operating site.

Advantageously, long-term measurements are made with regard to at least one physical parameter. For example, temperatures or humidity levels are measured over extended periods of time and preferably stored. In this way, variations in these values can also be defined.

As mentioned above, in this case it is possible for corresponding measurement devices to be available at the operating site. If these measurement devices are not available, it could be possible to provide a suitable test bench which has such measuring devices. For example, a case can be equipped with the necessary measuring instruments. The advantage of this approach is that very consistent measurements are recorded and measurement errors can also be excluded more easily. This case, for example, can contain the measuring instruments which are required in each case for creating the recipe, for example, for blow-moldable containers.

This case can have, for example, a central device with a long-term data logger for recording measurements. These measurements, as mentioned above, can be, for example, temperature readings, measurement values for air humidity, measurements of a degree of crystallinity (for example, in the context of infrared spectroscopy), a color of the plastic preform to be processed, an absorption level in the relevant spectrum (for example, using infrared spectroscopy) or else the identification of additional markings such as additional codes, wherein these codes can provide information about a preform manufacturer, a date of manufacture and any incorporated additives.

This marking can be, for example, alphanumeric codes, one-dimensional codes, two-dimensional codes, QR codes, data matrices and the like. Advantageously a wireless connection exists from this measurement device to a central device. In addition, a connection facility for such a measuring kit to the customer network is also preferably provided. Finally, a connection facility to a target machine is also preferably provided.

Furthermore, an operating procedure or an instruction manual can preferably be available on the central device. This "mini-laboratory" can advantageously be temporarily provided to a customer and after the completion of the recipe creation can be sent back to the manufacturer again. In this case it is preferable if such a device or such a case can be approved for sending by mail, to make re-packing unnecessary. In addition, such a measurement case can also have a GSM connection module for data transmission to the manufacturer.

In a further preferred method the second physical parameter is selected from a group of physical parameters which includes an age of the plastic preforms, a material of the plastic preforms, optical properties of the plastic preforms—in particular an IR absorption of the plastic preforms—and the like.

In particular, these second physical parameters are also properties which can affect a heating and/or a stretch blow molding process of the plastic preforms.

In a further preferred method a plurality of first parameters or a plurality of second parameters is determined. On the basis of this plurality of, in particular different, parameters (for example, temperature, air humidity and the like) a very accurate picture of the ambient conditions at the processing site or operating site can be created. On the basis of this picture, in turn, a very accurate simulation of machine conditions or a very accurate determination of operating recipes can be performed.

In a further preferred method, the operating recipe is determined after an initial installation of the system. It is thus conceivable that the system itself, or its own operation, can also have an impact on the environmental conditions. For example, the internal temperature of the oven can also have an impact on the ambient temperature in the machine room. In a preferred method, therefore, the appropriate machine is first put into a test or operational mode, and the environmental conditions are determined during the course of this operational mode. On the basis of these ambient conditions the corresponding operating recipes can then be created. It might also be possible for at least some of the physical parameters to be recorded outside of a system operation, such as those parameters which are not affected by the operation of the system, such as an outside temperature.

In a further preferred method at least one physical property is determined which is characteristic of a container produced by the system, and this physical property is taken into account in the determination of the operating recipe. Thus it is possible, for example, for the finished containers to be checked, for example for a wall thickness of plastic bottles to be determined and for this also to be taken into account. For example, if an actual value of a wall thickness deviates from a nominal value, this can also be considered in the determination of the operating recipe. It would be possible in this case for such measurements of the containers to be carried out on several occasions, for example after a molding machine, after a filling machine and after a labelling machine. In general, this means that such (measurement) values, which have a direct effect on the specific manufacturing process of the containers, can also be determined and transmitted.

The present invention is also directed at a system for handling containers, wherein this system for handling containers has a first handling device which handles the containers in a first predetermined manner, and at least one second handling device which handles the containers in a second predetermined manner, and a transport device which transports the containers from the first handling device to the second handling device. In addition, a control device is provided, which controls the handling of the containers by at least one of the two handling devices and in particular by both of the handling devices.

According to the invention, the system has at least one first recording device for recording at least one first physical parameter which is characteristic of environmental conditions at an operating site of the system, and/or a second recording device for recording at least one second physical parameter which is characteristic of a physical property of the containers to be handled, and an operating recipe determination device which is suitable and designed for determining an operating recipe, taking at least one of these parameters as a basis, which operating recipe is used by the control device to control at least one handling device.

In a preferred embodiment a transmission device is also provided, which transmits the recorded physical parameters, in particular by wireless means. Particularly preferably, the operating recipe determination device is located at a different location than the handling devices. The advantage of this is that the operating recipes are determined centrally, for example from a manufacturing site of the system manufacturer, and to this end the operating recipes do not need to be (cost-intensively and time-consumingly) determined at the installation site of the system.

In a further advantageous embodiment, the device has a simulation environment, within which environmental conditions determined by the at least one recording device can be simulated. In this case it is possible for these environmental conditions to be actually simulated, for example temperatures and humidity values determined in a test environment are created. It would also be possible, however, for the simulation environment to be a computer model which takes into account a wide range of operating data, and which can also take into account different systems or system parts.

In addition, it would also be possible to carry out said steps, i.e. the determination of an operating recipe, iteratively. For example, the ambient conditions could be measured and a first operating recipe could be determined on the basis of these ambient conditions. Then, the system is commissioned on the basis of this first operating recipe and a check is performed as to whether a production outcome corresponds to a specified target result. If this is not the case, individual operating parameters can be further adjusted.

BRIEF DESCRIPTION OF THE DRAWINGS

Further advantages and embodiments are obtained from the attached drawings, in which.

DETAILED DESCRIPTION OF THE INVENTION

Figure 1:
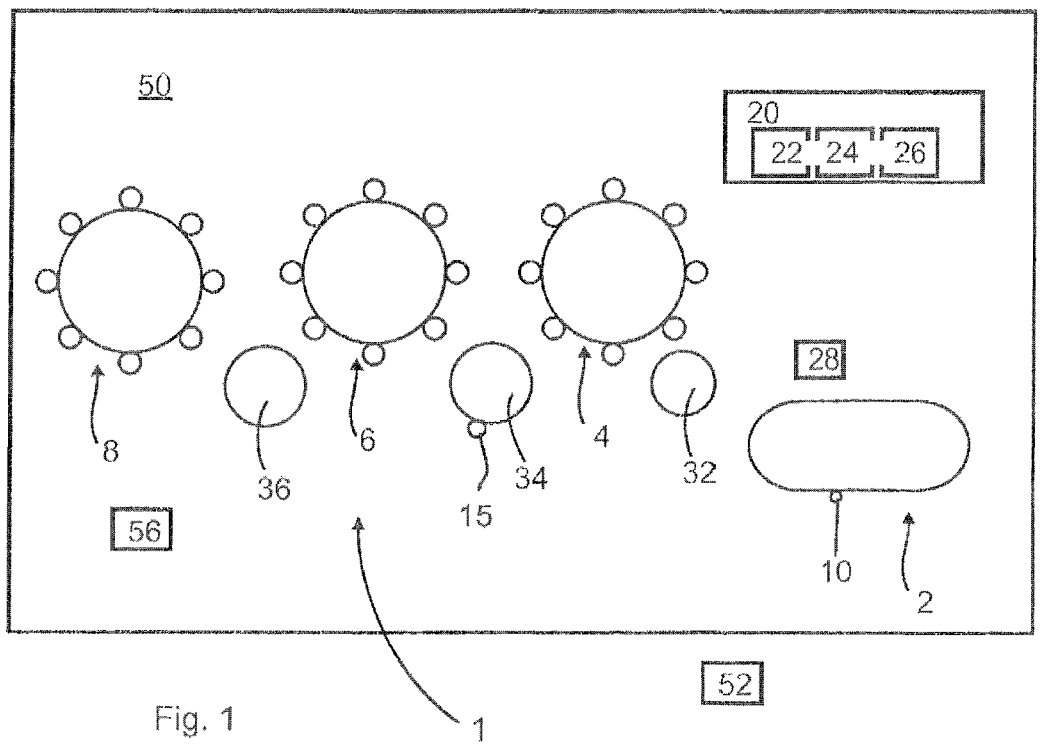
FIG. 1 shows a rough schematic representation of a system for handling containers.

FIG. 1 shows a rough schematic representation of a system for handling containers. This system has a first handling device 2 in the form of an oven, which heats plastic preforms 10. In this case, the plastic preforms 10 are transported and heated by (in particular stationary) heating elements. The plastic preforms thus heated are transferred via a transport device 32, for example a transfer starwheel, to a molding device 4 and there expanded to form plastic bottles 15. These plastic bottles 15 are transferred via a further transfer starwheel 34 to a further handling device, here in the form of a filling device 6, where they are filled with a liquid. The containers thus filled are transported via a further transfer starwheel 36 to a further handling device 8, where they are labelled, for example. Furthermore, the system can have a sterilization device (not shown), which sterilizes the plastic preforms or the plastic bottles manufactured therefrom.

The entire system 1 is located within an operating environment 50. This can be a machine hall, for example. The reference number 20 indicates a control device which is used to control the system 1 or the individual handling devices 2, 4, 6, 8. The reference number 22 indicates a first sensor device, which determines an environmental parameter or a first physical parameter P1, such as an ambient temperature or air humidity. This parameter is particularly preferably determined over a predefined period of time and stored in a memory device 24 (preferably time-dependently). The reference number 28 indicates a further sensor device, which records a further operating parameter.

In addition, a sensor device 52 can be provided, which determines a second parameter, such as an age or a temperature of the plastic preforms. For this purpose, as mentioned above, markings on the plastic preforms can be read out. These individual parameters are stored (in particular also time-dependently) in the memory device 24. The reference number 26 indicates a transmitting device, which transfers these physical parameters to a central processing unit (not shown, for example at the premises of the system manufacturer). The reference number 56 refers to a sensor device (only shown schematically) which determines at least one property of the containers produced, such as a wall thickness of the plastic containers. As mentioned, a plurality of such sensor devices can be present, which determine such values, for example at an output of the oven 2 or an output of the molding device 4.

Figure 2:
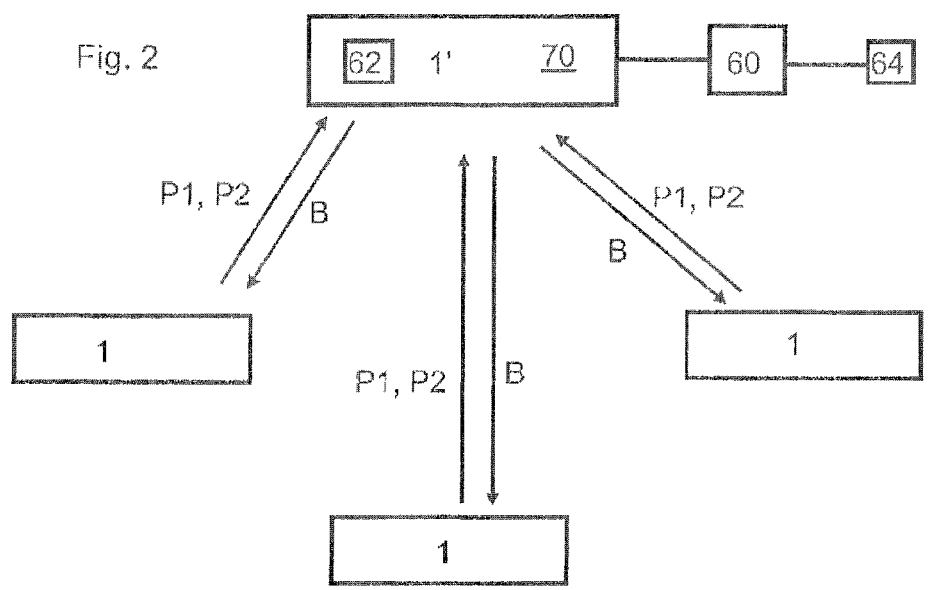
FIG. 2 shows a schematic representation of a method according to the invention.

FIG. 2 illustrates the procedure. The reference number 1 herein refers in each case to machines which transmit the physical parameters P1 and P2 and send them to a manufacturer. This manufacturer creates a simulation environment 70 on the basis of said physical parameters. In this simulation environment a test system 1' is put into operation, which in particular is designed identically to the machine 1. On the basis of this operation of the test system 1', operating parameters B are determined and these are output in turn to the individual machines 1, so that they can now work with parameters acquired under realistic environmental conditions or operating recipes determined in such a way. The reference number 60 schematically indicates an operating recipe determination device, which determines an operating recipe to operate the systems 1 on the basis of the parameters B1, B2. This operating recipe determination device can also access already known system-specific values. Preferably, the test system 1' also has other sensor devices 62, which determine characteristic parameters for the operation of the test system 1', such as temperature or pressure.

In addition, the test system preferably also has sensor devices 64, which determine parameters that are characteristic of containers handled by this test system 1. These acquired data (in conjunction with the parameters B1, B2) can be used to determine the operating recipe. The parameters B1, B2 can also be used as default values to create operating conditions in the test environment 70, which at least resemble the operating conditions at the operating sites of systems 1.

Figure 3:
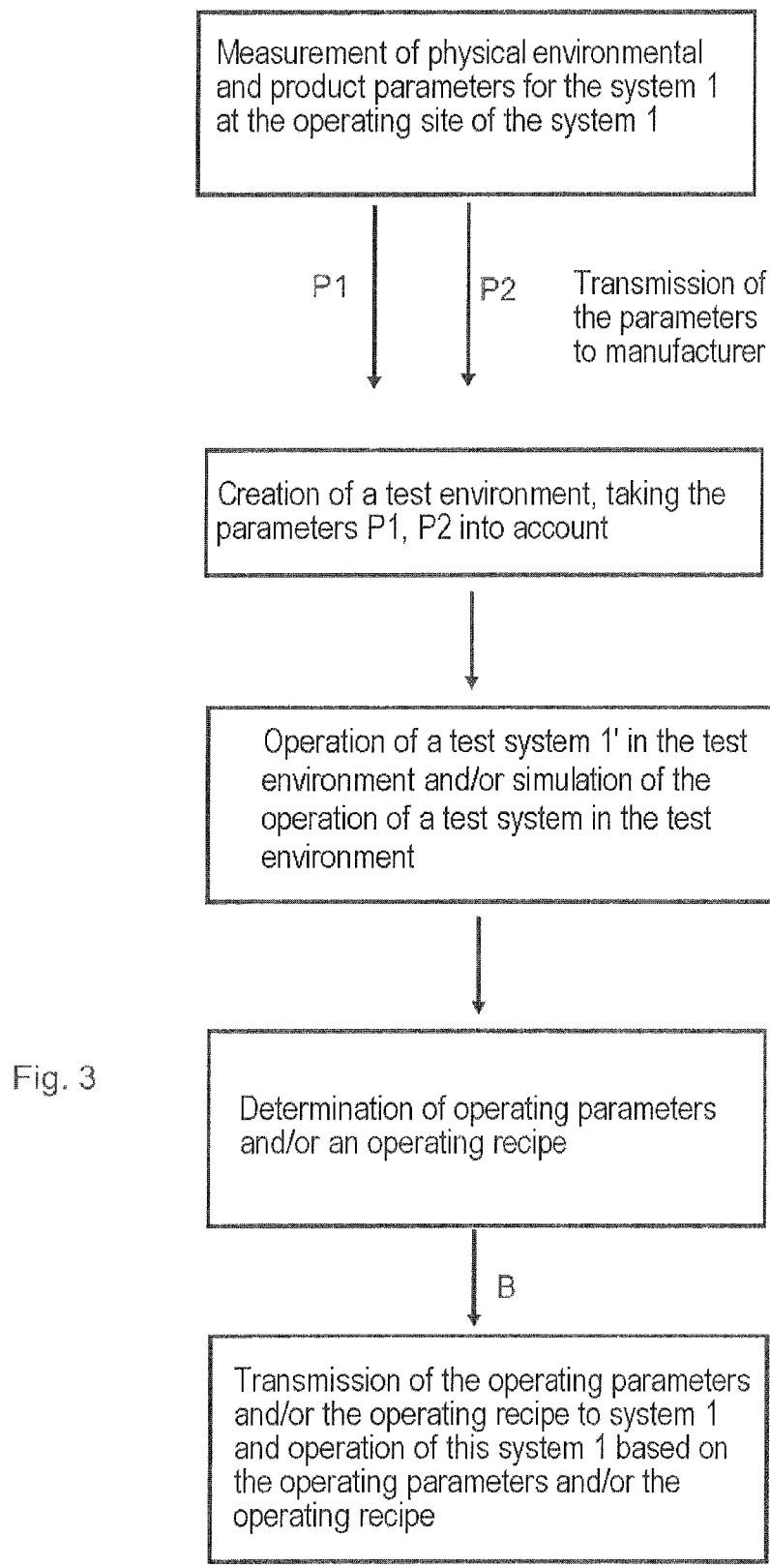
FIG. 3 shows a flow chart for a method according to the invention.

FIG. 3 shows a flow chart for a method according to the invention. Thus, in a first method step physical environmental and product parameters P1, P2 for the system 1 to be commissioned are acquired at the operating site of the system. These data are transmitted, for example to a manufacturer. The manufacturer creates a test environment, wherein the parameters P1 and P2 are taken into account. This can be, for example, as mentioned above, a climate chamber in which said conditions are simulated. In addition a test system 1' is operated in this test environment or the operation of a test system is simulated in this test environment. The latter is possible particularly if corresponding tests have already been carried out in advance or previously. On the basis of this test operation, operating parameters and/or an operating recipe B are determined and these operating parameters are in turn transferred to the user of the system 1 and the user can then operate this system 1 on the basis of these operating parameters B. In addition, a physical property of the handled containers can also be acquired and forwarded appropriately (not shown).

As mentioned above, the relevant files for the plastic preforms can also be determined with the aid of a test laboratory. Such sensor devices can also determine, for example, physical properties of the plastic preforms used, such as a material of the plastic preforms and the like. In addition, analyses of the material used for the plastic preforms can even be carried out at the machine operators premises. These analyses of the plastic preforms used can also be transmitted to the machine manufacturer in this case.

In addition, fluids produced or used during the operation of the system can also be analyzed. Thus, for example samples can be taken, for example samples of sterilization agents and the like, with which these are analyzed. These analysis results can be communicated to the system manufacturer.

The applicant reserves the right to claim all features disclosed in the application documents as essential to the invention, provided they are novel compared to the prior art whether individually or in combination. It is also pointed out that in the individual figures features have also been described, which may be advantageous in isolation. The person skilled in the art will recognize immediately that a particular feature described in a figure may be advantageous even without the incorporation of additional features from the same figure. The person skilled in the art will also recognize that advantages can be obtained by a combination of a plurality of features shown in individual or in different figures.

LIST OF REFERENCE NUMERALS 1 system
1' test system
2 handling device
4 molding device, handling device
6 handling device
8 handling device
10 plastic preforms
15 plastic bottle
20 control device
24 memory device
26 transmitting device
28 additional sensor device
22 first sensor device
32 transfer device
34 transfer starwheel
36 transfer starwheel
50 operating environment
60 operating recipe determination device
62, 64 sensor device
70 simulation environment
B operating parameters
B1, B2 parameters
P1, P2 physical parameters

The invention claimed is:

1. A method for operating a system for handling containers, wherein said system for handling containers has a first handling device which handles the containers in a first predetermined manner, and at least one second handling device which handles the containers in a second predetermined manner, and a transport device which transports the containers from the first handling device to the second handling device,
wherein
a control device controls the handling of the containers by at least one of the two handling devices using at least one first physical parameter which is characteristic of environmental conditions at an operating site of the system and using at least one second physical parameter which is characteristic of a physical property of the containers to be handled, wherein at least one of these physical parameters is determined and an operating recipe is determined independently of the system and taking this parameter as a basis, which operating recipe is used by the control device to control at least one handling device, and wherein the physical parameters are determined at the operating site and the operating recipe is determined on the basis of said physical parameters at a different site.

2. The method as claimed in claim 1,
wherein
the operating recipe is at least determined at a different location from the operating site.

3. The method as claimed in claim 1,
wherein
on the basis of the at least one physical parameter, operating conditions are simulated and/or created at the location different from the operating site, which are adapted to the environmental conditions at the operating site.

4. The method as claimed in claim 1,
wherein
the operating recipe is determined using another system for handling containers.

5. The method as claimed in claim 1,
wherein
the first physical parameter is selected from a group of physical parameters consisting of an ambient temperature in a machine room in which the system is located, an external temperature, an indoor temperature, an air pressure, a humidity, a moisture level of plastic preforms, and a temperature of plastic preforms.

6. The method as claimed in claim 1,
wherein
the second physical parameter is selected from a group of physical parameters consisting of an age of plastic preforms, a material of the plastic preforms, and an optical property of the plastic preforms.

7. The method as claimed in claim 1,
wherein
a plurality of first and/or second physical parameters is determined.

8. The method as claimed in claim 1,
wherein
the operating recipe is determined after a commissioning of the system for the first time.

9. The method as claimed in claim 1,
wherein
at least one physical property is determined, which is characteristic for a container produced by the system and this physical property is taken into account in the determination of the operating recipe.

10. A system for handling containers, wherein said system for handling containers has a first handling device which handles the containers in a first predetermined manner, and at least one second handling device which handles the containers in a second predetermined manner, and a transport device which transports the containers from the first handling device to the second handling device and with a control device, which controls the handling of the containers by at least one of the two handling devices, wherein
the system has at least one first recording device for recording at least one first physical parameter, which is characteristic of environmental conditions at an operating site of the system, and a second recording device for recording at least one second physical parameter, which is characteristic of a physical property of the containers to be handled, and an operating recipe determination device which is suitable and designed for determining an operating recipe, independently of the system, taking at least one of these parameters as a basis, which operating recipe is used by the control device to control at least one handling device, and wherein the physical parameters are determined at the operating site and the operating recipe is determined on the basis of said physical parameters at a different site.

11. The device as claimed in claim 10,
wherein
the device has a simulation environment, within which environmental conditions determined by the at least one recording device can be simulated.

12. The method according to claim 8,
wherein
the appropriate machine is first put into a test or operational mode, and the environmental conditions are determined during the course of this operational mode.

13. The method according to claim 1,
wherein
the operating recipe for operating the system is determined and in doing so local conditions of the system and/or conditions which are characteristic of the operation of the system at its operating site are taken into account.

14. The method according to claim 13, wherein the local conditions taken into account comprise climatic conditions at the operating site.

15. The method according to claim 13, wherein the conditions which are characteristic of the operation of the system comprise material specific conditions.

16. The method according to claim 1,
wherein
the operating recipe contains a plurality of operating parameters which are selectively chosen from a group of operating parameters consisting of an operating speed, an oven temperature for heating the plastic preforms, a pressure for expanding the plastic preforms, a rotation speed of the plastic preforms inside the heating device and a temperature.

17. The device according to claim 10,
wherein
the operating recipe determination device is located at a different location than the handling devices.

18. The method as claimed in claim 6, wherein the optical property is an IR absorption of the plastic performs.

19. The method as claimed in claim 1, wherein the different site is the site of manufacture of the system.

20. The device as claimed in claim 10, wherein the different site is the site of manufacture of the system.

* * * * *